United States Patent [19]

Broghammer

[11] 4,177,490

[45] Dec. 4, 1979

[54] SWITCHING DEVICE FOR CASSETTE TAPE RECORDERS

[75] Inventor: Werner Broghammer, Tennenbronn, Fed. Rep. of Germany

[73] Assignee: Dual Gebruder Steidenger, St. Georgen, Fed. Rep. of Germany

[21] Appl. No.: 875,558

[22] Filed: Feb. 6, 1978

[51] Int. Cl.$^2$ .................. G11B 21/22; G11B 15/18
[52] U.S. Cl. .................. 360/105; 360/96.5
[58] Field of Search .................. 360/96, 105, 93

[56] References Cited

U.S. PATENT DOCUMENTS

| | | | |
|---|---|---|---|
| 3,747,941 | 7/1973 | van der Lely | 360/96 |
| 4,024,580 | 5/1977 | Ban et al. | 360/96 |
| 4,071,859 | 1/1978 | Sami | 360/96 |

Primary Examiner—Robert S. Tupper
Attorney, Agent, or Firm—Martin A. Farber

[57] ABSTRACT

A cassette tape recorder for use with a cassette which has at least one opening on its wide side, through which opening, upon the insertion of the cassette into the device, there can be inserted at least one winding mandrel for engagement in the core of the tape spool, the cassette having at least one opening in one of its narrow sides, in which last mentioned opening, after the setting of the cassette on the winding mandrel by means of a feed device (which feed device can be transferred against the action of a spring into the operating position by means of a first control element and which feed device is again releasable out of this operating position by means of a second control element), the magnetic head is insertable in a direction perpendicular to the axis of the winding mandrel for the purpose of recording or playback, and which contains means which prevent a mechanical stressing of the magnetic head if with an inserted magnetic head, attempt is made to take the cassette from the device. The control element for release of the feed device for the magnetic head is moveable in the direction of the grabbing movement of the hand for the inserted cassette and is arranged bordering directly contiguous to the cassette in a manner such that the cassette can only be grabbed after the control element has been moved.

2 Claims, 4 Drawing Figures

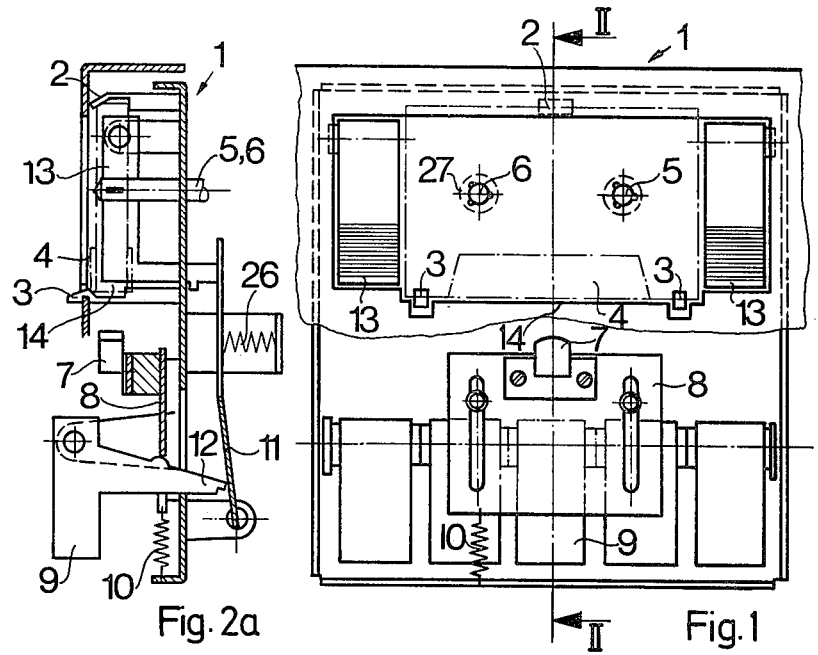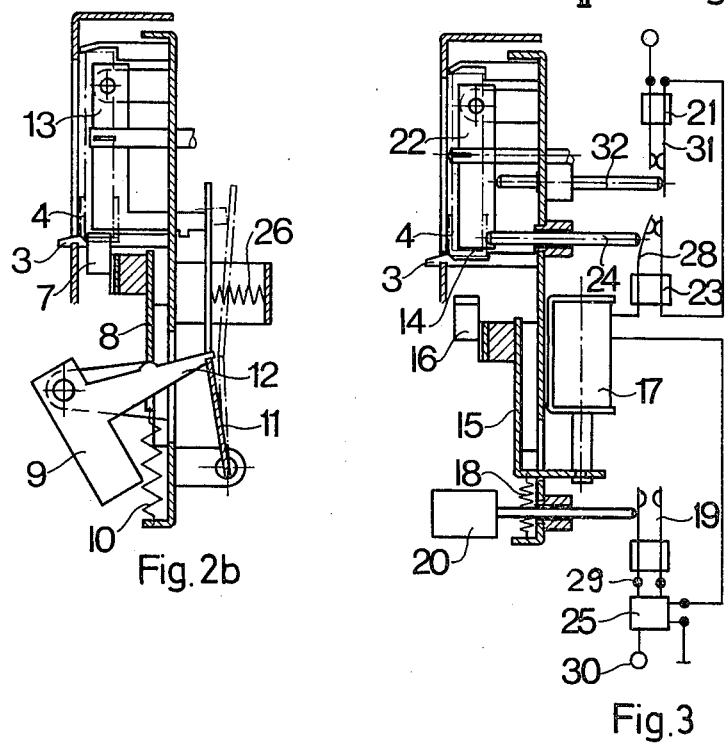

SWITCHING DEVICE FOR CASSETTE TAPE RECORDERS

The invention relates to a switching device for a cassette tape recorder in general.

More particularly, the present invention relates to a cassette tape recorder for use with a cassette which has at least one opening (e.g., 27 — the numerals in parentheses being provided only for general orientation) on its wide side, through which opening, upon the insertion of the cassette into the device, there can be inserted at least one winding mandrel (5, 6) for engagement in the core of the tape spool, the cassette having at least one opening (14) in one of its narrow sides, in which last-mentioned opening, after the setting of the cassette on the winding mandrel (5, 6), by means of a feed device (8, 15) — which feed device can be transferred against the action of a spring (10, 18) into the operating position by means of a first control element (9, 20) and which feed device is again releaseable out of this operating position by means of a second control element (13, 22) — the magnetic head (7, 16) is insertable in a direction perpendicular to the axis of the winding mandrel (5, 6) for the purpose of recording or playback, and which contains means which prevent a mechanical stressing of the magnetic head (7, 16) if with an inserted magnetic head, attempt is made to take the cassette from the device.

If with a device of the previously mentioned type, attempt is made to take a cassette from the device when the magnetic head is inserted into the cassette, the danger exists that the magnetic head goes out of adjustment by mechanical stress. If the device is switched off this danger as a rule does not exist since with the switching off operation customarily the feed device for the magnetic head also is released so that the magnetic head is pulled back away from the cassette. In the operating position "pause" the tape likewise stops as it does with recorders which are switched "off" or switched to "stop", respectively, however the head is nevertheless located in the cassette. If in this position, for example, from lack of knowledge about the position of the head, attempt is made to remove the cassette from the device, then the danger exists of an unwanted stressing of the magnetic head. The same danger also naturally exists if during playback attempt is made to remove the cassette.

Consequently it has proven advantageous to provide special cassette locking means which are effective with the insertion of the magnetic head into the cassette; that is they receive and accept the forces with an attempt at removal. The disadvantage of such an arrangement is that they limit the grabbing of, or access to, the cassette, or only allow it if previously an additional control operation is performed, for example, actuation of the stop button.

Conventionally cassette tape recorders have a pivotal compartment in which the cassette can be inserted during the open or swung-out position. By swinging-in or retracting this compartment into the plane of the cassette recorder in a locked operating position, the cassette is prevented or secured against access or grabbing. In order to again release this locking of the compartment, at least the actuation of a so-called ejection button is necessary. In many cases previously the actuation of a so-called stop button is still required. In any case also here at least one additional control operation is required.

It is an object on which the present invention is based to simplify the manipulation and operation which is required for a removal of the cassette.

It is another object of the present invention in accordance with the above-mentioned object to aid the solution of this object in the manner that, the control element (e.g., 13, 22) for release of the feed device (8, 15) for the magnetic head (7, 16) is moveable in the direction of the grabbing movement of the hand for the inserted cassette and is arranged bordering directly on or immediately contiguous to the cassette in a manner such that the cassette (4) can be grabbed only after the control element (13, 22) has been moved.

The advantage of the arrangement in accordance with the present invention resides in that on the one hand the unlocking of the removal-safeguard means cannot be forgotten, and on the other hand no additional control is required for the unlocking, since this takes place automatically with the grabbing movement for the cassette. A further advantage resides in that no particular removal-safeguarding means are necessary for the cassette, but rather the securing is achieved alone by the position of a control element which is present anyhow.

A further formation of the invention with a cassette recorder having a feed device (15) for the magnetic head which is brought into the operative position by means of a solenoid (17) and is held in this position, resides in an electronic switch (25) disposed in the circuit of the solenoid (17), which switch is connected with the first control element (20) for the setting of the normal forward operation and switches to conduction when the normal forward running is set, and a first contact pair (21) is disposed in the circuit of the solenoid (17), which contact pair is opened with the actuation of the second control element (22) for release of the feed device (15) and moreover a second contact pair (23) is disposed in the solenoid circuit, which second contact pair is closed by a sensing member (24) for the cassette (4) with the insertion of the cassette (4) in the cassette recorder (1). The advantage of this arrangement resides in that in each play position of the tape, the cassette can be taken from the tape recorder and again set thereon or it can be replaced by another, without requiring a further operation in addition to the actual grabbing movement for the cassette and to the insertion movement, so that for example if one is not satisfied with the playback of the cassette only the cassette needs to be exchanged in order to be able to continue the playback with the new cassette.

With the above and other objects and advantages in view, the present invention will become more clearly understood in connection with the following detailed description of two preferred embodiments, when considered with the accompanying drawings, of which:

FIG. 1 is a front view of a switching device in accordance with the present invention;

FIG. 2a is a view partially in section taken along the lines II—II in FIG. 1 in a stop position;

FIG. 2b is a view partially in section taken along the lines II—II in FIG. 1 in the record position or playback position;

FIG. 3 is a view of a second embodiment of a switching device in accordance with the present invention, the front view of which corresponds to FIG. 1, FIG. 3 being a side view corresponding to and taken along the section lines II—II of FIG. 1.

Referring now to the drawing, in the cassette recorder 1 there is disposed a device 2, 3 for reception or mounting of the cassette 4. With the insertion of the cassette 4 in the cassette recorder 1, the winding mandrels 5, 6 engage in the cassette 4. The magnetic head 7 is secured on a plate-shaped feed or delivery device 8. By means of a first control element 9 (formed as a push button) for setting of the normal running of the tape, the feed device 8 with the magnetic head 7 can be shifted forward into an operative position against the action of a spring 10 by means of a projection 12 of the control element 9, which projection extends through an opening in the feed device 8, and in the shifted position it can be locked by means of a safety catch 11 which steps behind the projection 12 of the push button 9. The members 11 and 12 thus constitute means for locking the first control element 9 in its actuated position. The safety catch 11 is coupled with a second control element 13, the latter being arranged directly contiguous or immediately adjacent to the cassette 4. Moreover the cassette 4 is mounted lowered or sunken into the device such that it cannot be grabbed by the hand.

If the feed device 8 is brought into its forward locked position by means of actuation of the first control element 9, the magnetic head 7 steps into an opening 14 in the narrow side of the cassette 4 and consequently arrives into its operative position.

By the arrangement in accordance with the present invention of the second control element 13, the latter is forcefully pressed down by one's hand during grabbing for the cassette 4 and consequently the safety catch 11 is brought into its inoperative position, which has the consequence of pulling back the feed device 8 with the magnetic head 7 by means of the action of the spring 10, the latter biasing the feed device 8 into its retracted position.

It is understood that the safety catch 11 can be brought into its inoperative position by the second control element 13 also with electromagnetic means.

Referring now again to the drawing and more particularly to FIG. 3, according to a further embodiment of the invention the feed device 15 for the magnetic head 16 can pass into its operating position by means of a solenoid or lifting magnet 17 against the action of a spring 18. A first contact pair 21 lies in the circuit of the solenoid 17, which contact pair can be displaced against the action of a leaf spring 31 by means of a ram 32, the control element 22 for releasing the feed device 15 for the magnetic head 16 being connected with the ram 32, and a second contact pair 23 which is connected with a sensing member 24 (the latter being constructed as a contact sensing pin), the sensing member 24 being shiftable against the action of the spring 28; moreover an electronic switch 25 which is controllable by a third contact pair 19, in the manner upon touching or contact of the third contact pair 19, the electronic switch 25 is switched to conduction, and the conduction is maintained until it is changed to the disconnected or interrupted condition by means of switching-off of the cassette recorder from the supply mains in a per se known manner (not illustrated further) by means of a second gate terminal or control connection 30.

With a cassette inserted in the recorder 1, the first and the second contact pairs (21 and 23) are closed. If a first control element 20 for setting of the normal forward running (record or playback), which is connected via a projection with the contact pair 19, is touched or pressed, the circuit of the solenoid 17 is closed by means of the electronic switch 25 via a control terminal 29 controlling the electronic switch 25 such that upon closing the contact pair 19 the electronic switch is closed to conduction (by pushing the contact pair 19 momentarily closed, one of the contacts of which is mounted on a leaf spring upwardly biasing the projection of the control element 20) and consequently the feed device 15 with the magnetic head 16 is drawn into the operative position with the magnetic head 16 entering in the opening 14 of the cassette 4.

If the cassette 4 is to be removed from the recorder, then with the grabbing for the cassette 4 the second control element 22 for releasing the feed device 15 for the magnetic head 16 is actuated and the first contact pair 21, which is connected with it via the ram 32 and spring 31, is pushed open and interrupts the current of the solenoid 17, so that under the action of the spring 18 the feed device 15 can pull the magnetic head 16 back out of the cassette 4 and the latter can be removed without risk or danger. Upon the removal indeed the first contact pair 21 again closes, however the current remains interrupted, since by means of the removal of the cassette 4 the contact pair 23 has opened, the contact pair 23 being operatively connected with the sensing member 24 for the cassette 4 via the spring contact 28.

The electronic switch 25 thereby remains in its condition without the solenoid 17 again receiving current. This has the result that automatically with the reinsertion of a cassette into the cassette recorder the magnetic head 16 likewise is again returned into its operating position since thereby the sensing member 24 presses the spring contact 28 together with the other contact and closes the second contact pair 23 and upon the withdrawal of one's hand from the cassette also the first contact pair 21 again closes so that the solenoid 17 again receives current.

The springs 26 (FIG. 1) and 31 (FIG. 3) constitute means for biasing the second control elements 13 and 22, respectively, in a direction against which the second control elements are actuated.

While I have disclosed several embodiments of the invention it is to be understood that these embodiments are given by example only and not in a limiting sense.

I claim:

1. Cassette tape recorder for use with a tape cassette, which on its wide side has at least one opening, through which a winding mandrel is insertable for engagement in the core of the spool of the tape and which in one of its narrow sides has at least one opening in which a magnetic head can be inserted, comprising winding mandrel means for operative engagement with the spool in the cassette, a magnetic head, feed means displaceably mounted in a plane perpendicular to the axis of said winding mandrel means for transferring said magnetic head into an operative position such that said magnetic head enters into the opening in a narrow side of the cassette, said magnetic head being secured on said feed means, first spring means biasing said feed means in a direction against displacement thereof into said operative position, a first control means for transferring said feed means into said operative position when said first control means is moved to an actuated position, a locking means for locking said first control means in said actuated position when said first control means is moved into said actuated position, a second control means having a direction of actuation corresponding to the movement of a person's hand during grabbing of an inserted cassette, said second control means being arranged directly contiguous to the inserted cassette such that the cassette only can be grabbed after said second control means has been moved in an actuated direction, second spring means biasing said second control means in a direction against movement in said actuated direction, said second control means being actuatable against said second spring means, mounting means for mounting the cassette inserted in the cassette tape recorder, said mounting means being formed such that the inserted cassette can only be grabbed by hand for the purpose of removal by moving said second control means in said actuated direction, means for transmitting a movement of said second control means to said locking means, whereby said locking means releases said first control means and said feed means is moved out of said operative position.

2. Cassette tape recorder for use with a tape cassette, which on its wide side has at least one opening, through which a winding mandrel is insertable for engagement in the core of the spool of the tape and which in one of its narrow sides has at least one opening in which a magnetic head can be inserted, comprising winding mandrel means for operative engagement with the spool in the cassette, a magnetic head, feed means displaceably mounted in a plane perpendicular to the axis of said winding mandrel means for transferring said magnetic head into its operative position such that said magnetic head enters into the opening in a narrow side of the cassette, said magnetic head is secured on said feed means, first spring means biasing said feed means in a direction against displacement thereof into said operative position, a solenoid means operatively connected with said feed means for said magnetic head for transferring said feed means into said operative position against the spring means and for holding said feed means thereat, a first control means for operatively actuating said solenoid to transfer said feed means into said operative position, a second control means having a direction of actuation corresponding to the movement of a person's hand during grabbing of an inserted cassette, said second control means being arranged directly contiguous to the inserted cassette such that the cassette only can be grabbed after said second control means has been moved in an actuated direction, second spring means biasing said second control means in a direction against movement in said actuated direction, said second control means being actuatable against said second spring means, mounting means for mounting the cassette inserted in the cassette tape recorder, said mounting means being formed such that the inserted cassette can only be grabbed by hand for the purpose of removal by moving said second control means in said actuated direction, a first contact pair operatively connected with said second control means, said second control means opening said first contact pair when said second control means is actuated, a sensing means for actuation thereof upon insertion of the cassette in the cassette tape recorder, third spring means biasing said sensing means into operative position in the recorder, a second contact pair operatively connected with said sensing means such that said second contact pair closes upon actuation of said sensing means upon insertion of the cassette in the cassette tape recorder and opens when no cassette is in the cassette tape recorder, a circuit for feeding power to said solenoid means, said first and said second contact pairs being connected in series in said circuit of said solenoid means whereby movement of said second control means in said direction of actuation opens said first contact pair and deactivates said solenoid, whereby said feed means is moved out of said operative position, a third contact pair, said first control means for at least momentary closing said third contact pair upon actuation of said first control means, an electronic switch disposed in said circuit of said solenoid means, a first control terminal means on said electronic switch being connected with said third contact pair and for controlling said electronic switch such that with the at least momentary closing of said third contact pair said electronic switch is switched to conduction, a second control terminal means on said electronic switch connected with a current supply for the cassette tape recorder and for controlling said electronic switch such that the latter remains conductive only as long as the current supply is maintained to the cassette tape recorder, whereby both said first and second contact pairs are closed after a cassette is inserted in the cassette tape recorder and said second control means is released whereby said solenoid is actuated and said feed means is moved into said operative position, and whereby after removal of a cassette from said cassette recorder, said second contact pair is open, said solenoid remains deactivated and said feed means remains out of the operative position while said electronic switch remains conductive as long as the current supply is maintained to the tape recorder, so that automatically with the reinsertion of a cassette in the tape recorder and release of said second control means said solenoid is activated and said feed means moves into the operative position again.

* * * * *

UNITED STATES PATENT AND TRADEMARK OFFICE
CERTIFICATE OF CORRECTION

PATENT NO. : 4,177,490
DATED : December 4, 1979
INVENTOR(S) : Werner Broghammer

It is certified that error appears in the above—identified patent and that said Letters Patent are hereby corrected as shown below:

Title page item [73] Assignee: "Dual Gebruder Steidenger, St. Georgen, Fed. Rep. of Germany" should read -- Dual Gebrüder Steidinger, St. Georgen, Fed. Rep. of Germany--

Signed and Sealed this

First Day of April 1980

[SEAL]

Attest:

SIDNEY A. DIAMOND

Attesting Officer

Commissioner of Patents and Trademarks